Feb. 8, 1966   W. A. PLUMMER   3,233,699
HEAT AND SOUND INSULATING JACKET FOR EXHAUST
GAS MUFFLER AND TAIL PIPE ASSEMBLY
Filed Jan. 2, 1962

INVENTOR.
WALTER A. PLUMMER
BY
ATTORNEY

United States Patent Office 3,233,699
Patented Feb. 8, 1966

3,233,699
HEAT AND SOUND INSULATING JACKET FOR EXHAUST GAS MUFFLER AND TAIL PIPE ASSEMBLY
Walter A. Plummer, 3546 Crownridge Drive, Sherman Oaks, Calif.
Filed Jan. 2, 1962, Ser. No. 169,698
1 Claim. (Cl. 181—62)

This application is a continuation-in-part of my co-pending application Serial No. 687,428, filed October 1, 1957 and now abandoned.

The present invention relates to protective enclosures for conduit assemblies and more particularly to a combined heat insulating and noise suppressing detachable jacket assembly especially designed for use on hot conduits such, for example, as those used in conducting exhaust gas from vehicle engines.

Despite the extensive study made of exhaust systems for motor vehicles and the success attained in suppressing exhaust noises, such systems have numerous undesirable characteristics which it is the purpose of the present invention to improve further. For example, the rigorous operating conditions to which motor vehicle exhaust systems are subject results in the premature failure of one or more components of these systems requiring their servicing or the replacement of components. Exhaust systems are customarily located on the underside of the vehicle and operate at relatively high temperatures. Being close to the ground and exposed, these hot pipes are the natural target of stones and all nature of contaminants including dirt, road surface chemicals and water. Chemicals used to melt snow and ice in the colder climates are extremely corrosive with respect to metals as is the salt air encountered in coastal regions. It is also apparent that the exposed metal walls of the exhaust system provide excellent sound-transmitting mediums for the noisy conditions existing within the interior of the exhaust system and which the muffler is only partially effective in suppressing. Still another highly objectionable condition involves the presence of unburned combustibles carried by the exhaust gases in high volume, particularly under certain driving conditions as during rapid acceleration and deceleration, down hill coasting and engine idling. These are believed to be a major contributor to obnoxious smog conditions prevalent in highly populated urban areas. Many of these unburned gases can be consumed before being exhausted from the tail pipe provided sufficiently high temperature conditions are maintained within the exhaust pipe.

It is the purpose of the present invention to provide a heat insulating jacket so designed as to be conveniently and quickly installed about the exhaust systems of both new motor vehicles and those previously assembled and now operating on the highways. The inexpensive jacket of this invention includes a very tough, flexible outer skin formed from laminated material and having bonded to its inner surface sound and heat absorbing material including special means for holding the jacket assembled about exhaust pipe and muffler units. The laminated skin includes heat reflecting metal foil, reinforcing material in the form of fiberglass which remains unaffected by high temperatures and is resistant to moisture, corrosive materials and other foreign matter, as well as a layer of nonporous high-temperature plastic material. This skin desirably is of uniform construction throughout and includes an integral guard flap extending across the longitudinal seam for the jacket and effective in preventing the fibrous insulating material from interfering with the closure of the fastening means as well as in preventing overheating of the overlying jacket fastening means.

The fastening means proper preferably includes extruded plastic tape having longitudinally extending interlocking tongues and grooves adapted to form a fluid-tight seam without need for attached metal parts of any kind or other auxiliary fastening devices. The detachable protective jacket so provided is adapted to be made in continuous lengths and packaged flat in readiness to be cut to any desired length and assembled about the exhaust pipe. Made in different widths, the jackets are designed to fit various sized exhaust pipes and muffler systems and can be installed quickly by the individual owner as well as by unskilled service station employees.

Accordingly, it is a primary object of the present invention to provide a protective cover and jacket especially adapted for use about heated fluid conveying conduit systems and particularly the exhaust and muffler systems of motor vehicles.

Another object of the invention is the provision of a jacket for conduits having a laminated flexible outer covering attached to heat and sound absorbing material and split longitudinally so that it may be readily assembled about existing conduit systems and held snugly closed thereabout in a fluid-tight manner by plastic seam means having interlocking components.

Another object of the invention is the provision of a protecting covering for conduit systems having a thin laminated cover formed from layers of heat reflecting materials bonded to fiberglass reinforcing and a moisture-proof plastic layer.

Another object of the invention is the provision of a fluid-tight jacket suitable for enclosing hot pipes and conduits and featuring an interior layer of sound and heat insulating material enclosed by a thin lightweight flexible skin impervious to fluids and having a reinforced plastic layer protected from overheating by heat reflecting metal foil laminated thereto and positioned between the plastic and the heat source, and which jacket includes plastic seam means extending longitudinally of the jacket and protected against overheating from the heat source by a guard flap strip of said skin and particularly by the metal foil layer thereof.

These and other more specific objects will appear upon reading the following specification and claim and upon considering in connection therewith the attached drawing to which they relate.

Referring now to the drawing in which a preferred embodiment of the invention is illustrated:

Figure 1:
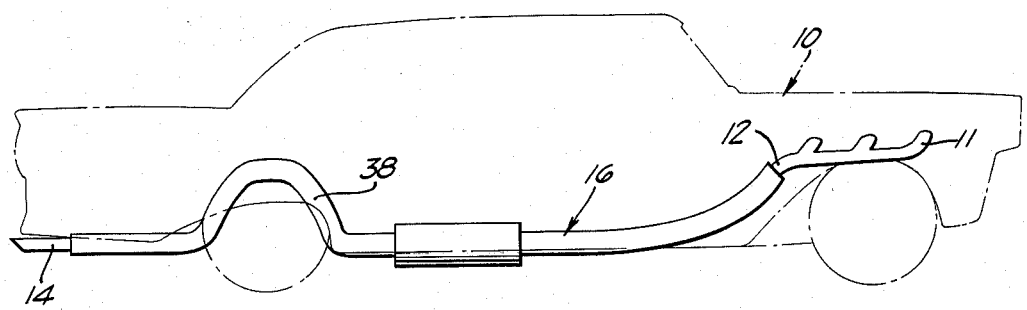
FIGURE 1 is a side elevational view of a typical exhaust system for a motor vehicle, the showing of the vehicle being indicated in dot-and-dash line.

Referring to FIGURE 1, there is shown the outline of a typical motor vehicle designated generally 10 having an engine not shown provided with an exhaust manifold 11. Welded or otherwise secured to manifold 11 is a conventional exhaust gas assembly comprising engine exhaust pipe 12, a suitable muffler 13 and a tail pipe section 14, all connected in series. Each of these exhaust system components is adapted to be enclosed by the protective covering and jacket forming an important feature of the present invention. This protective jacket will be best understood by reference to FIGURE 3 wherein it is seen to consist of an outer, flexible skin designated generally 16, and a thick layer of heat and sound absorbing fibrous material, as for example, fiberglass, bonded to skin 16 and interlocking holding means designated generally 18.

Figure 4:
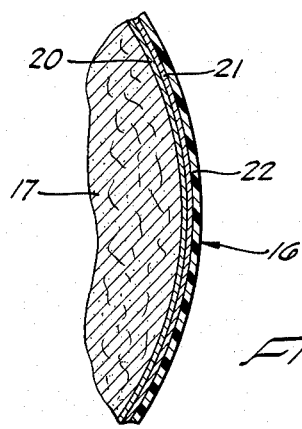
FIGURE 4 is an enlarged fragmentary sectional view showing the layers of the laminated skin.

A preferred embodiment of the flexible laminated covering 16 comprises at least three layers suitably bonded together in known manner including an inner layer 20 of heat reflecting metal foil such as aluminum, an intermediate layer of strong reinforcing fabric unaffected by heat, moisture and corrosive materials such as fiberglass 21, and an outer protective layer of a flexible nonporous or impervious plastic capable of withstanding high temperatures and highly resistant to moisture and miscellaneous roadway contaminants including ice and snow-melting chemicals. A particularly suitable one of the numerous plastics usable in skin 16 comprises vinyl. Although the heat reflecting foil layer 20 is shown as being on the inner side of the covering, it will be understood that it may be the intermediate layer if so desired; or it may even be located on the exterior of the plastic. Desirably, however, the laminate is assembled in the order illustrated in FIGURE 4 with the fibrous insulating material 17 being bonded directly to the inner side of the foil layer.

Although the jacket may be secured in place in various manners about the conduit and about the muffler device, it is advantageously provided with extruded plastic slide fastener tapes of identical contour 25 and 26 each having a web 27 fuse bonded or otherwise secured to the lateral edges of the laminated covering 16. It is desirable and preferred that slide fastener tape 26 be secured to the laminate cover along an area spaced inwardly from one edge to provide a guard flap 28 bridging the seam formed by the slide fastener and thereby serving to prevent interference of the fibrous insulating material with the tapes during their closure and with the heat reflecting foil underlying and protecting the seam-forming tapes from overheating from the hot exhaust structure.

Figure 3:
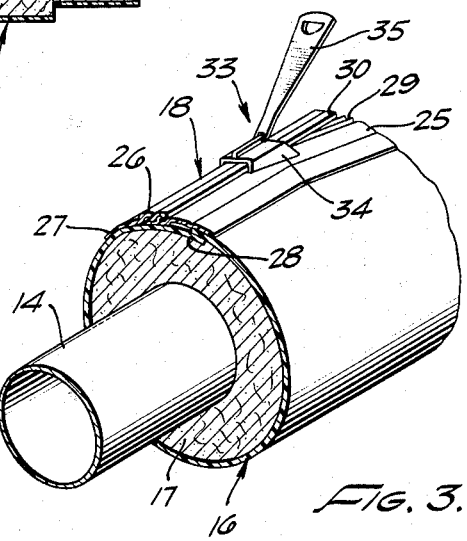
FIGURE 3 is a perspective view of the protective jacket as it is being installed on a section of pipe.

As is clearly shown in FIGURE 3, the tapes are secured to the edges of the jacket covering in such manner that their complementarily formed longitudinal extending interlocking tongues and grooves 29 and 30 can be pressed together to form a fluid-tight compact seam holding the jacket firmly assembly to the conduit. It will be understood that though the slide fastener tapes may be formed in various ways in carrying out the objectives of the present invention, a preferred construction is that disclosed in detail in my earlier filed copending application, Serial No. 777,817, filed December 1, 1958, entitled Plastic Tubing Product and Method of Making Same, now Patent No. 3,106,941, and reference may be had thereto for a more detailed description.

The tongue and groove sections of the fastener tapes may be pressed together by hand or the tapes may be provided with a closure device designated generally 33 consisting of a metal slide member 34 straddling the tongue and groove sections of the two tapes and provided with a finger pull piece 35 by which the device may be moved longitudinally of the seam and of assistance in closing the seam when pulled in one direction and in opening the same when pulled in the opposite direction.

Figure 2:
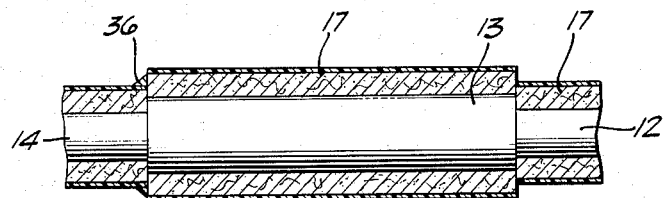
FIGURE 2 is a longitudinal view partially in section on an enlarged scale of apart of the exhaust system.

It will be understood that the jacket is manufactured flat and is packaged in the same manner for shipment in continuous lengths to the point of application to the conduit or to the exhaust system of a motor vehicle. The jackets are made in varying widths to form snug-fitting jackets for the exhaust conduit or the muffler, it being understood that a jacket of appropriate size and diameter is employed for each component of the exhaust system. As is shown in FIGURE 2, it is unnecessary to form a tight joint between the abutting ends of jackets for adjacent sections of different diameters, it being sufficient to cut them off with close-fitting abutting end surfaces in the manner shown at the right-hand end of muffler 13 in FIGURE 2. However, if desired, a suitable high temperature calking compound 36 may be applied as indicated at the left-hand end of the muffler in FIGURE 2, and this calking may be covered with friction tape or the like to increase the joint strength and to avoid the danger of vibrations and shock displacing the calking material.

Owing to the flexibility of both the heat absorbing material and the laminated outer skin, the jacket can be applied easily to curved sections of a conduit such as the humped section 38 of the tail pipe required to bypass the rear axle of vehicle 10. Both the covering material and the insulation flexes as necessary to accommodate readily bends in the pipe.

The guard flap 28 for the slide fastener joint performs an important function in holding the jackets in place about such bends in the conduit. This is for the reason that bends in the conduit act to contract the insulating material against guard flap 28 pressing it into firm frictional engagement with the interior wall of the covering and with the inner walls of the soft pliant slide fastener tape. This pressure acts to hold the tongues and grooves interlocked as well as to grip the opposite sides of the seam and to prevent it from opening.

In applying the covering to the conduit, it is merely neressary to unroll the length desired and cut it to size without waste of any kind. The covering is then wrapped about the pipe sections as the tongues and grooves are pressed together either by hand or by the use of the slide fastener device 33. Slits are easily cut in the covering as required to fit the jacket about pipe hangers or other supporting devices. These slits may be closed by calking compound, tape or other appropriate means.

It will be understood that the jacket provided by the present invention is adapted to be installed by the car owner or the novice following the simplest of installation instructions and without need for removing or disconnecting the components being jacketed. Once in place, the covering prevents water, moisture and foreign materials of all kinds from penetrating the jacket skin and coming in contact with the hot exhaust pipe. The sound and heat absorbing material not only smothers vibrations in the side walls of the conduit and muffler but absorbs noises from the pipe. Any heat reaching the laminated skin is reflected inwardly by metal foil 20. In consequence of this action and the insulating qualities of the intervening layer of fiberglass 21, the plastic outer layer 22 and the seam-forming tapes 25 and 26 never become excessively warm and it is found in practice that its life is fully as long as the extended life of the exhaust system resulting from the application of the described jacket thereto.

If it should become desirable to inspect or to repair the exhaust components for any reason, this may be accomplished by opening the seam formed by the interlocking tongues and grooves 29, 30 and opening the jackets as necessary to give access to the underlying components. After the inspection has been completed, the jackets are reclosed and continue to operate as efficiently and effectively as before. Alternatively, and if desired, the seam may be bonded closed by a suitable bonding agent.

While the particular protective conduit jacket herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claim.

I claim:

That improvement in exhaust gas assemblies for motor propelled vehicles having an exhaust gas assembly leading from the engine manifold and including a muffler and a tail pipe, which improvement comprises a combination noise suppressor and insulating protective jacket adapted to be applied about said exhaust gas assembly, said jacket including a plurality of elongated tubular sections each having a thin, flat, flexible, impervious laminated exterior skin comprising an outer layer of plastic and inner layers of heat reflecting foil and fiberglass all bonded together, a relatively thick layer of fibrous heat and sound insulating material bonded to the inner surface of said laminated skin, and seam closure means secured directly to and along the lateral edges of said laminated skin for holding said tubular jacket sections secured snugly about the exterior of said exhaust gas assembly, said seam closure means comprising extruded plastic slide fastener means provided with interlocking tongues and grooves for holding said jacket in place, said laminated sheet including a guard flap projecting laterally along and inside of one of said slide fastener means and serving to keep said fibrous material out of said fastener means while the same is being closed, said guard flap comprising a lateral edge portion of said laminated skin and including a layer of heat reflecting foil underlying said slide fastener means and cooperating with the remainder of the foil layer to provide a heat rejecting layer encircling the entire circumference of an exhaust gas assembly and underlying said seam closure means, and said tubular sections being arranged in end-to-end abutting relation along the length of said exhaust gas assembly.

References Cited by the Examiner

UNITED STATES PATENTS

| | | | |
|---|---|---|---|
| 756,203 | 4/1904 | Barthel | 181—62 |
| 877,840 | 1/1908 | Gee | 181—62 |
| 2,726,977 | 12/1955 | See et al. | 154—44 |
| 2,756,172 | 6/1956 | Kidd | 154—144 |
| 2,761,525 | 9/1956 | Moss | 181—62 |
| 2,834,427 | 5/1958 | Powers et al. | 181—61 |
| 2,937,664 | 5/1960 | Plummer | 138—128 |
| 2,949,975 | 8/1960 | Plummer | 181—33.4 |
| 3,006,403 | 10/1961 | Cooper et al. | 161—93 |

FOREIGN PATENTS

| | | |
|---|---|---|
| 474,114 | 6/1951 | Canada. |
| 1,234,799 | 5/1960 | France. |

LEO SMILOW, *Primary Examiner.*